United States Patent [19]

Burns et al.

[11] Patent Number: 5,789,514

[45] Date of Patent: Aug. 4, 1998

[54] METHOD FOR PREPARING HYDROPHOBIC SILICA GELS

[75] Inventors: Gary Thomas Burns; James Richard Hahn; Clifford Carlton Reese, all of Midland, Mich.

[73] Assignee: Dow Corning Corporation, Midland, Mich.

[21] Appl. No.: 806,016

[22] Filed: Feb. 24, 1997

[51] Int. Cl.⁶ .................................................. C08G 77/06
[52] U.S. Cl. ............................. 528/12; 528/21; 528/23; 528/31
[58] Field of Search .................... 528/12, 23, 21, 528/31

[56] References Cited

U.S. PATENT DOCUMENTS

| | | |
|---|---|---|
| 3,015,645 | 1/1962 | Tyler . |
| 3,024,126 | 3/1962 | Brown . |
| 3,122,520 | 2/1964 | Lentz . |
| 3,979,546 | 9/1976 | Lewis . |

OTHER PUBLICATIONS

Brunauer Emmett and Teller, Jour. Am.. Chem. Soc., 60:309 (1938).

Primary Examiner—Melvyn I. Marquis
Attorney, Agent, or Firm—William F. Boley

[57] ABSTRACT

A method for the preparation of hydrophobic silica gels which are useful as reinforcing fillers in rubber compositions. The method comprises two steps, where in the first step a silica hydrosol is contacted with a sufficient concentration of a strong mineral acid at a pH less than about pH 1 to form a silica hydrogel. In the second step the silica hydrogel is contacted with described organosilicon compounds in the presence of a catalytic amount of a strong acid to effect hydrophobing of the silica hydrogel thereby forming a hydrophobic silica gel having a surface area within a range of about 100 $m^2/g$ to 750 $m^2/g$ as measured in the dry state. In a preferred method the hydrophobic silica hydrogel is contacted with a sufficient quantity of a water-immiscible organic solvent to convert the hydrophobic silica hydrogel into a hydrophobic silica organogel.

16 Claims, No Drawings

METHOD FOR PREPARING HYDROPHOBIC SILICA GELS

BACKGROUND OF INVENTION

The present invention is a method for the preparation of hydrophobic silica gels which are useful as reinforcing fillers in rubber compositions. The method comprises two steps, where in the first step a silica hydrosol is contacted with a sufficient concentration of a strong mineral acid at a pH less than about pH 1 to form a silica hydrogel. In the second step the silica hydrogel is contacted with described organosilicon compounds in the presence of a catalytic amount of a strong acid to effect hydrophobing of the silica hydrogel thereby forming a hydrophobic silica hydrogel having a surface area within a range of about 100 m²/g to 750 m²/g as measured in the dry state. In a preferred process the hydrophobic silica gel is contacted with a sufficient quantity of a water-immiscible organic solvent to convert the hydrophobic silica hydrogel into a hydrophobic silica organogel having a surface area within a range of about 100 m²/g to 750 m²/g as measured in the dry state.

Although hydrophobic silica gels prepared by the present method are useful in many applications such as reinforcing and extending filler in natural rubbers, thermal insulation, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength values. One means for improving the physical properties of such silicone rubbers involves the incorporation of a reinforcing silica filler into the fluid or gum prior to curing. However, silica reinforcing fillers have a tendency to interact with the polydiorganosiloxane fluid or gum causing a phenomenon typically referred to as "crepe hardening." A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are pre-formed solids.

Tyler, U.S. Pat. No. 3,015,645, teaches the making of hydrophobic silica powders by reacting an organosilicon compound such as dimethyldichlorosilane or trimethylmethoxysilane with an silica organogel in the presence of an acidic catalyst and then removing the volatile materials. The method requires the preparation of a silica hydrogel which is converted to an silica organogel by replacing the water in the hydrogel with an organic solvent.

Lentz, U.S. Pat. No. 3,122,520, teaches a procedure where an acidic silica hydrosol is first heated to develop a reinforcing silica structure and then mixed with an organosilicon compounds, an acid catalyst, and a water-immiscible organic solvent to produce a hydrophobic silica filler. The organosilicon compounds taught by Lentz are limited to those compounds in which the organic radicals bonded to silicon atoms have less than 6 carbon atoms, organosilicon compounds having no organofunctional substituents bonded to silicon atoms, and to organosilicon compounds having no hydrogen bonded to silicon atoms.

SUMMARY OF INVENTION

The present invention is a method for the preparation of hydrophobic silica gels which are useful as reinforcing fillers in rubber compositions. The method comprises two steps, where in the first step a silica hydrosol is contacted with a sufficient concentration of a strong mineral acid at a pH less than about pH 1 to form a silica hydrogel. In the second step the silica hydrogel is contacted with described organosilicon compounds in the presence of a catalytic amount of a strong acid to effect hydrophobing of the silica hydrogel thereby forming a hydrophobic silica gel having a surface area within a range of about 100 m²/g to 750 m²/g as measured in the dry state. In a preferred method the hydrophobic silica hydrogel is contacted with a sufficient quantity of a water-immiscible organic solvent to convert the hydrophobic silica hydrogel into a hydrophobic silica organogel having a surface area within a range of about 100 m²/g to 750 m²/g as measured in the dry state.

DESCRIPTION OF INVENTION

The present invention is a method for preparing a hydrophobic silica gel. The method comprises:

(A) contacting a silica hydrosol comprising about 0.02 to 0.5 g of $SiO_2$ per milliliter with a sufficient concentration of a strong mineral acid such that the pH of the silica hydrosol is less than about pH 1 thereby forming a silica hydrogel and (B) contacting the silica hydrogel with (1) a catalytic amount of a strong acid and (2) an organosilicon compound described by formula

$$R^1_a R^2_b H_c SiX_{4-a-b-c} \tag{1}$$

where each $R^1$ is independently selected from a group consisting of non-aromatic hydrocarbon radicals comprising 6 to about 12 carbon atoms and organofunctional hydrocarbon radicals comprising about 1 to 12 carbon atoms, each $R^2$ is an independently selected hydrocarbon radical comprising about 1 to 12 carbon atoms, each X is independently selected from a group consisting of halogen and alkoxy radicals comprising about 1 to 12 carbon atoms, a=0, 1, 2, or 3, b=0, 1, or 2, c=0 or 1, a+c=1, 2, or 3, and a+b+c=1, 2, or 3 with the proviso that when c=1 then a+b+c=2 or 3 to form a hydrophobic silica hydrogel having a surface area within a range of about 100 m²/g to 750 m²/g as measured in the dry state.

The present invention is a two step method, comprising steps (A) and (B), for making hydrophobic silica gels. Step (A) of the method comprises contacting a silica hydrosol with a strong mineral acid at a pH less than about pH 1 to form a silica hydrogel. Step (B) comprises contacting the silica hydrogel prepared in step (A) with defined organosilicon compounds which react with the silica hydrogel to give a hydrophobic silica hydrogel. In a preferred method the hydrophobic silica hydrogel is contacted with sufficient water-immiscible organic solvent to convert the hydrophobic silica hydrogel to a hydrophobic silica organogel. Hydrophobic silica gels prepared by the present method are useful as reinforcing fillers in, for example, silicon elastomers and organic rubber compositions.

In the present method, a silica hydrosol comprising about 0.02 g to 0.5 g of $SiO_2$ per ml of silica hydrosol can be used. The method used to prepare the silica hydrosol is not critical and can be any of those known in the art. The silica hydrosol may be prepared, for example, by deionizing sodium silicate by a method such as the use of an ion exchange resin. Alternatively, the silica hydrosol may be prepared by hydrolyzing a silane at a low temperature. Useful methods for preparing the silica hydrosol are provided in the examples herein.

In step (A) of the present method, the silica hydrosol is contacted with a sufficient concentration of a strong mineral acid such that the pH of the silica hydrosol is less than about pH 1 to form a silica hydrogel. Preferably, there should be a sufficient amount of the strong mineral acid present so that the pH is essentially 0, that is so that the pH cannot be measured. For the purpose of this invention any strong mineral acid can be used. As used herein, the term "strong mineral acid" refers to those acids which ionize to the extent of at least 25 percent in 0.1N aqueous solution at 18° C. The strong mineral acid may be, for example, hydrochloric, hydroiodic, sulfuric, nitric, and phosphoric acid.

In an alternative embodiment of the present invention, the silica hydrogel of step (A) may be aged prior to the conduct of step (B) at a pH less than about 1, a temperature within a range of about 10° C. to 250° C., and for a period of time within a range of about 10 minutes to 76 hours. Preferred is when the silica hydrogel is aged at a pH of about 0. If necessary, the pH of the silica hydrogel can be lowered by use of a strong mineral acid as described for use in step (A). Preferred is when the silica hydrogel is aged at a temperature within a range of about 50° C. to 150° C. Even more preferred is when the silica hydrogel is aged at a temperature within a range of about 75° C. to 110° C. A preferred length of time for aging the silica hydrogel is within a range of about 1 to 24 hours.

If desired, the silica hydrogel of step (A) may be subjected to a shearing force to reduce aggregate particle size and to improve the uniformity of the particle size distribution, prior to the conduct of the hydrophobic reaction of step (B). If shearing is conducted, it is preferred that shearing of the silica hydrogel be performed after any aging of the silica hydrogel. The shearing force may be applied to the silica hydrogel by any of those methods known in the art. The shearing force may be applied, for example, by a mechanical means such as a high-speed mixer or by ultrasound. This reduction in aggregate particle size and improved uniformity of particle size can provide for hydrophobic silica gels which when compounded into silicone elastomer compositions provide for lower viscosity compositions, more stable compositions, and for cured silicone elastomers having improved clarity and physical properties The conditions of step (A) must be such that the silica hydrogel acquires a structure such that the final product after hydrophobing has a surface area in the dry state within a range of about 100 $m^2$/g to 750 $m^2$/g as determined by the Brunauer Emmett and Teller (BET) method described in the Jour. Am. Chem. Soc. 60:309 (1938) and as further described in Lentz, U.S. Pat. No. 3,122,520 which is hereby incorporated by reference for such a teaching. The surface area of the silica hydrogel at the conclusion of step (A) is immaterial provided it is such that the surface area of the product after the hydrophobing of step (B) is within the above described range. Generally the surface area of the silica hydrogel is reduced by the hydrophobing reaction, since the organosilyl groups which become attached to the surface of the silica hydrogel increase the average particle size. The surface of the silica hydrogel can be above 750 $m^2$/g provided that the hydrophobing treatment brings it within a range of about 100 $m^2$/g to 750 $m^2$/g. To determine the proper conditions for conduct of step (A) it is necessary to proceed with the hydrophobing of step (B) and then measure the surface area of the resulting product in the dry state. If the surface area of the resulting product in the dry state is above 750 $m^2$/g, then the conditions of step (A) were too mild. If the surface area of the resulting product in the dry state is below 100 $m^2$/g, then the aging conditions of step (A) were too severe. Examples of suitable acid concentrations, temperatures, and times for conduct of step (A) are provided in the Examples herein. If the surface area of the hydrophobic silica gel in the dry state is above or below the described range, the hydrophobic silica gels have diminished reinforcing properties in silicone elastomers.

In step (B) of the present method the silica hydrogel of step (A) is contacted with one or more of the defined organosilicon compounds in the presence of a catalytic amount of a strong acid. In step (B), the strong acid can be the same acid which was used in step (A). However, if desired the silica hydrogel can be washed free of acid and a catalytic amount of strong acid added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the silica hydrogel. In step (B) the limitation on pH as described for step (A) does not apply. It is only necessary that a catalytic amount of a strong acid be present in an amount sufficient to effect reaction of the organosilicon compound with the silica hydrogel. Examples of useful acids include hydrochloric, sulfuric, and benzene sulfonic acids. It is preferred that in step (B) the strong acid catalyst provide a pH less than about 2.5.

The temperature at which step (B) is conducted is not critical and can be within a range of about 20° C. to 250° C. Generally it is preferred that step (B) be conducted at a temperature within a range of about 30° C. to 150° C. Step (B) can be conducted at the reflux temperature of the water-immiscible organic solvent when present.

In step (B) the silica hydrogel of step (A) is reacted with an organosilicon compound described by formula (1). In formula (1), each $R^1$ is independently selected from a group consisting of non-aromatic hydrocarbon radicals comprising 6 to about 12 carbon atoms and organofunctional hydrocarbon radicals comprising about 1 to 12 carbon atoms. $R^1$ can be a saturated or unsaturated non-aromatic hydrocarbon radical. R1 can be a substituted or non-substituted, non-aromatic hydrocarbon radical. $R^1$ can be for example, hexyl, heptyl, octyl, decyl, dodecyl, hexenyl, and 6-chlorohexyl. $R^1$ can be an organofunctional hydrocarbon radical comprising about 1 to 12 carbon atoms where, for example, the functionality is mercapto, disulfide, polysulfide, amino, carboxylic acid, carbinol, ester, or amido. A preferred organofunctional hydrocarbon radical is one having disulfide or polysulfide functionality.

In formula (1), each $R^2$ is an independently selected hydrocarbon radical comprising about 1 to 12 carbon atoms. $R^2$ can be unsubstituted or substituted and saturated or unsaturated. $R^2$ can be, for example, an alkyl such as methyl, ethyl, propyl; a substituted alkyl such as 3,3,3- trifluoropropyl and chloromethyl; an alkenyl such as vinyl and allyl; and an aryl such as phenyl.

In formula (1) each X is independently selected from a group consisting of halogen and alkoxy radicals comprising about 1 to 12 carbon atoms. When X is a halogen, it is preferred that the halogen be chlorine. When X is an alkoxy radical, X may be, for example, methoxy, ethoxy, and propoxy. Preferred is where each X is selected from a group of consisting of chlorine atoms and methoxy.

Examples of organosilicon compounds useful in the present method include dimethylchlorosilane, dimethyldichlorosilane, vinylmethyldichlorosilane, vinyldimethylchlorosilane, hexenylmethyldichlorosilane, hexenyldimethylchlorosilane, mercaptopropylmethyldimethoxysilane, and bis{3-(triethoxysilyl)propyl}tetrasulfide.

The organosilicon compound may be provided to the present method as a single compound as described by formula (1) or as a mixture of two or more organosilicon compounds described by formula (1). The organosilicon compound may be provided to the present method as a mixture with those organosilicon compounds described in Lentz, U.S. Pat. No. 3,122,520, which is incorporated by reference for the teaching of such compounds, where the organosilicon compounds described by formula (1) comprise at least 0.1 weight percent of the mixture.

The amount of organosilicon compound added to the method is that sufficient to adequately hydrophobe the silica hydrogel to provide a hydrophobic silica gel suitable for its intended use. Generally the organosilicon compound should be added to the method in an amount such that there is at least 0.04 organosilyl unit per $SiO_2$ unit in the silica hydrogel. The upper limit of the amount of organosilicon compound added to the process is not critical since any amount in excess of the amount required to saturate the silica hydrogel will act as a solvent for the method.

The hydrophobic silica hydrogel of step (B) may be used as is or may be recovered for use by such methods as centrifugation or filtration. The hydrophobic silica hydrogel may be dried by the use of such methods as heating or reducing pressure or a combination of both heating and reducing pressure.

In a preferred method a water-immiscible organic solvent in sufficient amount to convert the silica hydrogel or hydrophobic silica hydrogel to the corresponding organogel is added to the method. The organic solvent can be added prior to, simultaneously with, or subsequent to the addition of the organosilicon compound. That is the silica hydrogel can be first converted into an organogel by replacement of the water with the organic solvent. On the other hand the organosilicon compound and the organic solvent can be added simultaneously to the silica hydrogel. Under these conditions the reaction of the silica hydrogel with the organosilicon compound and the replacement of the water in the silica hydrogel with the organic solvent may occur simultaneously. Finally the organosilicon compound can be added prior to the organic solvent, in which case the silica hydrogel reacts with the organosilicon compound and the resulting product is then converted into a silica organogel by the addition of an organic solvent. In the latter two cases the conversion to a silica organogel is accomplished by a phase separation, in which the hydrophobic silica hydrogel passes into the organic solvent phase. A preferred method is where a water-immiscible organic solvent is added after formation of the hydrophobic silica hydrogel thereby effecting formation of a hydrophobic silica organogel.

For purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as a solvent it may serve both as a solvent and as a reactant with the silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent is not critical so long as there is sufficient solvent to convert the silica hydrogel into a silica organogel. Preferably the water-immiscible organic solvent should have a boiling point below about 250° C. to facilitate its removal from the hydrophobic silica gel, however the boiling point is not critical since the solvent may be removed from the hydrophobic silica gel by centrifuging or other suitable means.

During the conduct of step (B) is may be desirable to add a surfactant or water-miscible solvent to facilitate the reaction of the organosilicon compound with the silica hydrogel. The surfactant or water-miscible solvent may be added in the presence or absence of any water-immiscible organic solvent added to the method. Suitable surfactants include, for example, anionic surfactants such as dodecylbenzene sulfonic acid, nonionic surfactants such as polyoxyethylene(23) lauryl ether and $(Me_3SiO)_2MeSi(CH_2)_3(OCH_2CH_2)_7OMe$ where Me is methyl, and cationic surfactants such as N-alkyltrimethyl ammonium chloride Suitable water-miscible solvents include, for example, alcohols such as ethanol, propanol, and tetrahydrofuran.

After the hydrophobic silica hydrogel has been converted to the hydrophobic silica organogel the resulting product may be employed per se. That is the hydrophobic organogel may be used directly as a reinforcing agent in silicone rubber or in any other uses for which this type of product can be used. Alternatively, the solvent may be removed from the hydrophobic silica organogel and the resulting dry hydrophobic silica gel used.

The following examples are provided to illustrate the present invention. These examples are not intended to limit the scope of the present claims.

EXAMPLE 1

A silica gel hydrophobed with hexenylmethyldichlorosilane was prepared. 750 ml of PQ N Clear Sodium Silicate (PQ Corporation, Valley Forge, Pa.) was diluted with 1350 ml of deionized water. This solution was added at a rate of 420 ml per minute to a stirred solution comprising 280 ml of concentrated HCl (Fisher Certified, Fisher Scientific, Pittsburg, Pa.) diluted with 620 ml of deionized water. After completion of the addition, the mixture was stirred for 2 minutes. The mixture was then titrated with a sodium silicate solution comprising 25 ml of PQ N Clear (P Q Corporation) in 75 ml of deionized water to a pH of 2.5. The resulting product comprised about 3100 ml of a silica hydrosol containing 0.1 g $SiO_2$/ml.

The silica hydrosol prepared as described above was deionized by pumping through a 1.5 m×5 cm column packed with 1500 ml of Dowex 50WX8-100 ion exchange resin in the acid form (The Dow Chemical Company, Midland, Mich.) at a rate of 60 ml minute. The pH of the column effluent was monitored until the pH dropped below 0.5, at which point the remaining 2000–2400 ml of deionized silica hydrosol effluent was collected.

The deionized silica hydrosol was agglomerated by placing 2000 ml of the deionized silica hydrosol in a 5 L flask and while stirring adding 626 ml of concentrated HCl (Fisher Certified). The silica hydrogel which formed within a few minutes of addition of the HCl was broken-up by additional stirring to form a silica hydrogel suspension. The silica hydrogel suspension was aged at 100° C. for 3 hours and then cooled to 40° C.

The silica hydrogel suspension was hydrophobed as follows. To the silica hydrogel suspension, rapidly stirred at 48° C., was added 872 ml of isopropanol followed by addition of 105 ml of hexenylmethyldichlorosilane. The resulting mixture was heated to 85° C. for 30 minutes and then cooled to 50° C. Two liters of toluene were added to the mixture. This mixture was stirred for an additional 5 minutes, then stirring stopped and the aqueous phase drained from the bottom of the flask. The toluene phase was washed with 1 L of deionized water. The flask was fitted with a Dean-Stark trap and the toluene phase refluxed to remove residual water. The toluene was removed by distillation under reduced pressure leaving as product a hydrophobic silica gel. The hydrophobic silica gel was dried overnight at 150° C. to remove residual toluene. The yield of hydrophobic silica gel was 258 g.

EXAMPLE 2

A silica gel hydrophobed with hexenylmethyldichlorosilane and hexamethyldisiloxane was prepared. A silica hydrosol comprising about 0.1 g of $SiO_2$/ml was prepared and deionized as described in Example 1. The deionized silica hydrosol was agglomerated and aged as described in Example 1 to form a silica hydrogel suspension.

The silica hydrogel suspension was hydrophobed as follows. To the silica hydrogel suspension, stirred at 48° C. at in a 5 L flask, was added 872 ml of isopropanol followed by addition of 62.6 ml of hexenylmethyldichlorosilane to the flask. After stirring for an additional 5 minutes, 85 ml of hexamethyldisiloxane was added and stirring continued for one hour. Two liters of toluene were then added to the flask. The flask content was stirred for an additional 5 minutes, then stirring stopped and the aqueous phase drained from the bottom of the flask. The toluene phase was washed with 1 L of deionized water. The flask was fitted with a Dean-Stark trap and the toluene phase refluxed to remove residual water. The toluene was removed by distillation under reduced pressure leaving as product a hydrophobic silica gel. The hydrophobic silica gel was dried for 4 hours at 80° C to remove residual toluene. The yield of hydrophobic silica gel was 244 g.

EXAMPLE 3

A silica gel hydrophobed with mercaptopropylmethyldimethoxysilane was prepared. A silica hydrosol comprising about 0.1 g of $SiO_2$/ml was prepared and deionized as described in Example 1. The deionized silica hydrosol was agglomerated and aged as described in Example 1 to form a silica hydrogel suspension.

The silica hydrogel suspension was hydrophobed as follows. To the silica hydrogel suspension, rapidly stirred at 48° C. in a 5 L flask, was added 872 ml of isopropanol followed by 96 ml of mercaptopropylmethyldimethoxysilane. Stirring was continued for an additional 45 minutes. Two liters of toluene were then added to the flask. The flask content was stirred for an additional 5 minutes, then stirring stopped and the aqueous phase drained from the bottom of the flask. The toluene phase was washed and a dried hydrophobic silica gel recovered by a procedure similar to that described in Example 1. The yield of dried hydrophobic silica gel was 262 g.

EXAMPLE 4

A silica gel hydrophobed with mercaptopropylmethyldimethoxysilane and hexamethyldisiloxane was prepared. A silica hydrosol comprising about 0.1 g of $SiO_2$/ml was prepared and deionized as described in Example 1. The deionized silica hydrosol was agglomerated and aged as described in Example 1 to form a silica hydrogel suspension.

The silica hydrogel suspension was hydrophobed as follows. To the silica hydrogel suspension, stirred at 48° C. in a 5 L flask, was added 872 ml of isopropanol followed by the addition of 48 ml of mercaptopropylmethyldimethoxysilane and 452 ml of hexamethyldisiloxane. Stirring of the flask content was continued for an additional 5 minutes, then stirring stopped and the aqueous phase drained from the bottom of the flask. The toluene phase was washed and refluxed to remove residual water as described in Example 1. The hydrophobic silica gel was separated from the toluene by distillation. The hydrophobic silica gel was dried for 5 hours at 115° C to remove residual toluene. The yield of dried hydrophobic silica gel was 266 g.

EXAMPLE 5

A silica gel hydrophobed with dimethylchlorosilane was prepared. A silica hydrosol comprising about 0.1 g of $SiO_2$/ml was prepared and deionized as described in Example 1. The deionized silica hydrosol was agglomerated and aged as described in Example 1 to form a silica hydrogel suspension.

The silica hydrogel suspension was hydrophobed as follows. To the silica hydrogel suspension, stirred at 48° C. in a 5 L flask, was added 872 ml of isopropanol followed by the addition of 125 ml of dimethylchlorosilane over a period of 16 minutes. Stirring of the flask content was continued for an additional 30 minutes. Then, 2.4 liters of toluene where added to the flask. The flask content was stirred for an additional 5 minutes, then stirring stopped and the aqueous phase drained from the bottom of the flask. The toluene phase was washed and refluxed to remove residual water as described in Example 1. The hydrophobic silica gel was separated from the toluene by evaporation. The hydrophobic silica gel was dried by heating at 75° C. for 20 hours. The yield of dried hydrophobic silica gel was 232 g.

EXAMPLE 6

A silica gel hydrophobed with hexenylmethyldichlorosilane and dimethyldichlorosilane was prepared (volume ratio of 1:1.7). 500 ml of PQ N Clear Sodium Silicate (PQ Corporation) was diluted with 750 ml of deionized water. This solution was added at a rate of 420 ml per minute to a rapidly stirring solution comprising 750 ml of concentrated HCl (Fisher Certified) diluted with 500 ml of deionized water to form a silica hydrosol comprising 0.08 g $SiO_2$/ml.

The silica hydrosol was agglomerated by placing 2.5 L of the silica hydrosol in a 5 L flask and stirring. The silica hydrogel which formed within a few minutes of addition to the flask was broken-up by additional stirring. The agglomerated silica hydrogel suspension was aged at 100° C. for 3 hours and then cooled to room temperature.

The silica hydrogel suspension was hydrophobed as follows. To the silica hydrogel suspension, stirred at room temperature, was added 833 ml of isopropanol followed by the addition of 52 ml of hexenylmethyldichlorosilane. Stirring of the flask content was continued for 5 minutes and then 88 ml of dimethyldichlorosilane were added to the flask. The flask content was stirred for 45 minutes at room temperature, and then 1.4 liter of toluene were added to the flask. The flask content was stirred for an additional 5 minutes, then stirring stopped and the aqueous phase drained from the bottom of the flask. An additional 1 L of toluene was added to the flask with stirring. The toluene phase was washed with 1 L of deionized water. The flask was fitted with a Dean-Stark trap and the toluene phase refluxed to remove residual water. After removal of the water, the toluene phase was transferred to a large pan in a hood and the toluene allowed to evaporate overnight. The recovered hydrophobic silica gel was dried by heating overnight at 80° C. The yield of dried hydrophobic silica gel was 285 g.

EXAMPLE 7

A silica gel hydrophobed with hexenylmethyldichlorosilane and dimethyldichlorosilane was prepared (volume ratio of 1:3.9). A silica hydrosol comprising 0.08 g of $SiO_2$/ml was prepared as described in Example 6. The silica hydrosol was agglomerated and aged as described in Example 6 to provide a silica hydrogel suspension.

The silica hydrogel suspension was hydrophobed as follows. To the silica hydrogel suspension, stirred at room temperature in a 5 L flask, was added 833 ml of isopropanol followed by the addition of 25.8 ml of hexenylmethyldichlorosilane. Stirring of the flask content was continued for 5 minutes and then 100 ml of dimethyldichlorosilane were added to the flask. The flask content was stirred for 45 minutes at room temperature, and then 1.4 liter of toluene were added to the flask. The flask content was stirred for an additional 5 minutes, then stirring stopped and the aqueous phase drained from the bottom of the treatment flask. An additional 1 L of toluene was added to the flask with stirring. The toluene phase was washed, refluxed to remove residual water, and evaporated as described in Example 6 to recover a hydrophobic silica gel. The hydrophobic silica gel was dried by heating overnight at 80° C. The yield of dried hydrophobic silica gel was 285 g.

EXAMPLE 8

A silica gel hydrophobed with bis{3-(triethoxysilyl) propyl}tetrasulfide and dimethyldichlorosilane was prepared (volume ratio of 1:7.6). A silica hydrosol comprising 0.08 g of $SiO_2$/ml was prepared as described in Example 6. The silica hydrosol was agglomerated and aged as described in Example 6 to provide a silica hydrogel suspension. The silica hydrogel suspension was hydrophobed as follows. To the silica hydrogel suspension, stirred at room temperature in a 5 L flask, were added 833 ml of isopropanol followed by the addition of 15 ml of bis{3-(triethoxysilyl) propyl}tetrasulfide. Stirring of the flask content was continued for 5 minutes and then 114 ml of dimethyldichlorosilane was added to the flask. The flask content was stirred for 45 minutes at room temperature, and then 1.4 liter of toluene were added to the flask. The flask content was stirred for an additional 5 minutes, then stirring stopped and the aqueous phase drained from the bottom of the flask. An additional 1 L of toluene was added to the flask with stirring. The toluene phase was washed, refluxed to remove residual water, and evaporated as described in Example 6 to recover a hydrophobic silica gel. The hydrophobic silica gel was dried by heating overnight at 80° C. The yield of hydrophobic silica gel was 274 g.

Example 9. A silica gel hydrophobed with bis{3-(triethoxysilyl)propyl}tetrasulfide and dimethyldichlorosilane was prepared (volume ratio of 1:1.9). A silica hydrosol comprising 0.08 g of $SiO_2$/ml was prepared as described in Example 6. The silica hydrosol was agglomerated and aged as described in Example 6 to provide a silica hydrogel suspension.

The silica hydrogel suspension was hydrophobed as follows. To the silica hydrogel suspension, stirred at room temperature in a 5 L flask, was added 833 ml of isopropanol followed by the addition of 50.2 ml of bis{3-(triethoxysilyl) propyl}tetrasulfide. Stirring of the flask content was continued for 5 minutes and then 96 ml of dimethyldichlorosilane were added to the flask. The flask content was stirred for 45 minutes at room temperature, and then 1.4 liter of toluene were added to the flask. The flask content was stirred for an additional 5 minutes, then stirring stopped and the aqueous phase drained from the bottom of the flask. An additional 1 L of toluene was added to the flask with stirring. The toluene phase was washed, refluxed to remove residual water, and evaporated as described in Example 6 to recover a hydrophobic silica gel. The hydrophobic silica gel was dried by heating overnight at 80° C. The yield of dried hydrophobic silica gel was 286 g.

EXAMPLE 10

A silica gel hydrophobed with bis{3-(triethoxysilyl) propyl}tetrasulfide and dimethyldichlorosilane was prepared. 400 ml of PQ N Clear Sodium Silicate (PQ Corporation) was diluted with 600 ml of deionized water. This solution was added at a rate of 420 ml per minute to a stirring solution comprising 600 ml of concentrated HCl (Fisher Certified) diluted with 600 ml of deionized water to form a silica hydrosol comprising 0.08 g $SiO_2$/ml.

The silica hydrosol was agglomerated by placing in a 5 L flask and stirring. The silica hydrogel which formed within a few minutes of addition of the silica hydrosol to the flask was broken-up by additional stirring. The silica hydrogel was aged by heating at 100° C. for 3 hours.

The silica hydrogel was hydrophobed as follows. To the silica hydrogel, with stirring at room temperature, was added 666 ml of isopropanol followed by the addition of 96 ml of dimethyldichlorosilane. The flask content was stirred for 45 minutes at room temperature, and then 1.4 L of toluene were added. The flask content was stirred for an additional 5 minutes, then stirring stopped and the aqueous phase drained from the bottom of the flask. A additional 1 L of toluene was added to the flask with stirring. The toluene phase was washed with 500 ml of deionized water. The flask was fitted with a Dean-Stark trap and the toluene phase refluxed to remove residual water. The flask content was cooled to 50° C. and 10.6 ml of bis{3-(triethoxysilyl)propyl}tetrasulfide added. After stirring the flask content for 5 minutes, 2.5 ml of dimethyldichlorosilane were added to acidify the flask content. The flask content was heated to reflux for several minutes, cooled to below 80° C., 50 ml of deionized water added, and heated to reflux for several more minutes. The toluene phase was transferred to a large pan in a hood and the toluene evaporated leaving a hydrophobic silica gel. The hydrophobic silica gel was dried for 7 hours at 85° C. The yield of dried hydrophobic silica gel was 230 g.

EXAMPLE 11

A sheared silica gel hydrophobed with bis{3-(triethoxysilyl)propyl}tetrasulfide and dimethyldichlorosilane was prepared. 400 ml of PQ N Clear Sodium Silicate (PQ Corporation) was diluted with 600 ml of deionized water. This solution was added at a rate of 420 ml per minute to a stirring solution comprising 600 ml of concentrated HCl (Fisher Certified) diluted with 600 ml of deionized water to form a silica hydrosol comprising 0.08 g $SiO_2$/ml.

The silica hydrosol was agglomerated by placing in a 5 L flask and stirring. The silica hydrogel which formed within a few minutes of addition of the silica hydrosol to the flask was broken-up by additional stirring. The silica hydrogel was aged by heating at 100° C. for 3 hours.

The silica hydrogel was sheared in a Waring Blender (Model 7011, Waring Products Division of Dynamics Corporation of America, New Hartford, Conn.) for one minute and then returned to the 5 L flask.

The silica hydrogel was hydrophobed as follows. To the silica hydrogel, with stirring at room temperature, was added 666 ml of isopropanol followed by the addition of 96 ml of dimethyldichlorosilane. The flask content was stirred for 45 minutes at room temperature, and then 1.4 L of toluene were added. The flask content was stirred for an additional 5 minutes, then stirring stopped and the aqueous phase drained from the bottom of the flask. A additional 1 L of toluene was added to the flask with stirring. The toluene phase was washed with 500 ml of deionized water. The flask was fitted with a Dean-Stark trap and the toluene phase refluxed to remove residual water. The flask content was cooled to 50° C. and 10.6 ml of bis{3-(triethoxysilyl)propyl}tetrasulfide added. After stirring the flask content for 5 minutes, 5.3 ml of trimethylchlorosilane was added to acidify the flask content. The flask content was heated to reflux for several minutes, cooled to below 80° C., 50 ml of deionized water added, and heated to reflux for several more minutes. The toluene phase was transferred to a large pan in a hood and the toluene evaporated leaving a hydrophobic silica gel. The hydrophobic silica gel was dried for 7 hours at 85° C. The yield of dried hydrophobic silica gel was 237 g.

EXAMPLE 12

A sheared silica gel hydrophobed with hexenylmethyldichlorosilane and dimethyldichlorosilane was prepared. 400 ml of PQ N Clear Sodium Silicate (PQ Corporation) was diluted with 600 ml of deionized water. This solution was added at a rate of 420 ml per minute to a stirring solution comprising 600 ml of concentrated HCl (Fisher Certified) diluted with 600 ml of deionized water to form a silica hydrosol comprising 0.08 g $SiO_2$/ml.

The silica hydrosol was agglomerated by placing in a 5 L flask and stirring. The silica hydrogel which formed within a few minutes of addition of the silica hydrosol to the flask was broken-up by additional stirring. The silica hydrogel was aged by heating at 100° C. for 3 hours.

The silica hydrogel was sheared in a Waring Blender (Model 7011, Waring Products Division of Dynamics Corporation of America, New Hartford, Conn.) for one minute and then returned to the 5 L flask.

The silica hydrogel was hydrophobed as follows. To the silica hydrogel, with stirring at room temperature, was added 666 ml of isopropanol followed by the addition of 96 ml of dimethyldichlorosilane. The flask content was stirred for 45 minutes at room temperature, and then 1.4 L of toluene were added. The flask content was stirred for an additional 5 minutes, then stirring stopped and the aqueous phase drained from the bottom of the flask. An additional 1 L of toluene was added to the flask with stirring. The toluene phase was washed with 500 ml of deionized water. The flask was fitted with a Dean-Stark trap and the toluene phase refluxed to remove residual water. The flask content was cooled to 50° C. and 8.5 ml of hexenyldimethylchlorosilane added. The flask content was heated to reflux for several minutes, cooled to below 80° C., 50 ml of deionized water added, and heated to reflux for several more minutes. The toluene phase was transferred to a large pan in a hood and the toluene evaporated leaving a hydrophobic silica gel. The hydrophobic silica gel was dried for 7 hours at 85° C. The yield of dried hydrophobic silica gel was 216 g.

EXAMPLE 13

A silica gel hydrophobed with bis{3-(triethoxysilyl)propyl}tetrasulfide and hexamethylsiloxane was prepared. 625 ml of PQ N Clear Sodium Silicate (PQ Corporation) was diluted with 1125 ml of deionized water. This solution was added at a rate of 420 ml per minute to a stirring solution comprising 217 ml of concentrated HCl (Fisher Certified) diluted with 533 ml of deionized water to form a silica hydrosol comprising 0.1 g $SiO_2$/ml.

The silica hydrosol was adjusted to pH 2.5 by addition of a dilute solution of PQ N Clear Sodium Silicate (PQ Corporation). The silica hydrosol was deionized by pumping through a column packed with an ion exchange resin as, described in Example 1, until the pH of the effluent was less than 0.5.

The deionized silica hydrosol was agglomerated by placing in a 5 L flask and stirring. The silica hydrogel which formed within a few minutes of addition of the silica hydrosol to the flask was broken-up by additional stirring. The silica hydrogel was aged by heating at 100° C. for 3 hours.

The silica hydrogel was hydrophobed as follows. To the silica hydrogel, with stirring at 40° C., was added 872 ml of isopropanol followed by addition of 14 ml of bis{3-(triethoxysilyl)propyl}tetrasulfide. The flask content was stirred for 15 minutes and then 112 ml of hexamethyldisiloxane were added to the flask. The flask content was stirred for 45 minutes at room temperature, and then 1.4 L of toluene were added to the flask. The flask content was stirred for an additional 5 minutes, then stirring stopped and the aqueous phase drained from the bottom of the flask. The toluene phase was washed with 1 L of deionized water. The flask was fitted with a Dean-Stark trap and the toluene phase refluxed to remove residual water. The toluene phase was transferred to a large pan in a hood and the toluene evaporated leaving a hydrophobic silica gel. The hydrophobic silica gel was dried overnight at 85° C. The yield of dried hydrophobic silica gel was 235 g.

EXAMPLE 14

Dried hydrophobic silica gels prepared by the methods of Examples 10, 11, and 12 were compounded into an oil extended styrene-butadiene copolymer composition, cured, and selected physical properties determined. The dried hydrophobic silica gels prepared by the methods of Examples 10, 11, and 12 were compounded at 47 parts per hundred into an oil extended styrene-butadiene copolymer heated to 100° C. To these mixtures were add standard antioxidants and cure accelerators. The mixtures were heated, with mixing, until the temperature reached 160° C. The mixtures were cooled and then cured in appropriate configurations for physical properties testing by hot pressing at 34.5 MPa and 150° C. for 36 minutes. The cured rubber compositions were tested for tensile strength, elongation, and modulus by the test methods described in ASTM D412 and the results are provided in Table 1.

TABLE 1

Physical Properties of Cured Organic Rubber Compositions Reinforced With Hydrophobic Silica Gels

| Physical Property | Example Number | | |
|---|---|---|---|
| | 10 | 11 | 12 |
| Tensile (MPa) | 23.5 | 24.8 | 20.4 |
| Modulus @ 100% (MPa) | 3.3 | 4.1 | 2.0 |
| Modulus @ 300% (MPa) | 9.4 | 11.7 | 6.1 |
| Elongation (%) | 739 | 648 | 865 |

We claim:

1. A method for preparing a hydrophobic silica gel comprising (A) contacting a silica hydrosol comprising from 0.02 to 0.5 g of $SiO_2$ per milliliter with a sufficient concentration of a strong mineral acid such that the pH of the silica hydrosol is less than about pH 1 thereby forming a silica hydrogel and (B) contacting the silica hydrogel with (1) a catalytic amount of a strong acid and (2) an organosilicon compound described by formula $$R^1_a R^2_b H_c SiX_{4-a-b-c},$$

where each $R^1$ is independently selected from the group consisting of non-aromatic hydrocarbon radicals comprising 6 to about 12 carbon atoms and organofunctional hydrocarbon radicals comprising about 1 to 12 carbon atoms, each $R^2$ is an independently selected hydrocarbon radical comprising about one to 12 carbon atoms, each X is independently selected from the group consisting of halogen and alkoxy radicals comprising 1 to 12 carbon atoms, a=0, 1, 2, or 3, b=0, 1, or 2, c=0 or 1, a+c=1, 2, or 3, and a+b+c=1, 2, or 3 with the proviso that when c=1 then a+b+c=2 or 3 to form a hydrophobic silica hydrogel having a surface area within a range of about 100 m²/g to 750 m²/g as measured in the dry state.

2. A method according to claim 1, where the pH of the silica hydrosol is essentially pH 0.

3. A method according to claim 1 further comprising aging the silica hydrogel of step (A) at less than about pH 1 and a temperature within a range of about 10° C. to 250° C. for a period of time within a range of about 10 minutes to 76 hours prior to conduct of step (B).

4. A method according to claim 1 further comprising aging the silica hydrogel of step (A) at about pH 0 and a temperature within a range of about 50° C. to 150° C. for a period of time within a range of about 1 hour to 24 hours prior to conduct of step (B).

5. A method according to claim 1 further comprising shearing the silica hydrogel of step (A) prior to conduct of step (B).

6. A method according to claim 1, where the contacting of step (B) is effected at less than about pH 2.5.

7. A method according to claim 1, where the contacting of step (B) is effected at a temperature within a range of about 20° C. to 250° C.

8. A method according to claim 1, where the contacting of step (B) is effected at a temperature within a range of about 30° C. to 150°.

9. A method according to claim 1, where the organosilicon compound is selected from the group consisting of dimethylchlorosilane, vinylmethyldichlorosilane, hexenyldimethylchlorosilane, hexenylmethyldichlorosilane, mercaptopropylmethyldimethoxysilane, and bis{3-(triethoxysilyl)propyl}tetrasulfide.

10. A method according to claim 1, where the organosilicon compound provides at least 0.04 organosilyl units per $SiO_2$ unit of the silica hydrogel.

11. A method according to claim 1 further comprising contacting the hydrophobic silica hydrogel with a water-immiscible organic solvent in sufficient amount to convert the hydrophobic silica hydrogel to a hydrophobic silica organogel.

12. A method according to claim 1 further comprising during the mixing of step (B) the presence of a surfactant which facilitates reaction of the organosilicon compound with the silica hydrogel.

13. A method according to claim 1 further comprising during the mixing of step (B) the presence of a water-miscible solvent which facilitates reaction of the organosilicon compound with the silica hydrogel.

14. A composition prepared by the method of claim 3.

15. A composition prepared by the method of claim 3.

16. A composition prepared by the method of claim 11.

* * * * *